United States Patent [19]
Shido et al.

[11] Patent Number: 5,510,858
[45] Date of Patent: Apr. 23, 1996

[54] TELEVISION RECEIVER HAVING AN STM MEMORY

[75] Inventors: Shunichi Shido, Sagamihara; Katsunori Hatanaka, Yokohama; Kunihiro Sakai, Isehara; Takahiro Oguchi, Yamato; Akihiko Yamano, Sagamihara, all of Japan

[73] Assignee: Canon Kabushiki Kaisha, Tokyo, Japan

[21] Appl. No.: 169,218

[22] Filed: Dec. 20, 1993

[30] Foreign Application Priority Data

Dec. 25, 1992  [JP]  Japan ................................. 4-346306

[51] Int. Cl.⁶ .................................................. H04N 9/64
[52] U.S. Cl. ........................ 348/718; 348/714; 358/335; 369/126
[58] Field of Search ............................ 348/714, 715, 348/718, 719, 725, 726; 358/342, 335, 341, 343; 369/99, 126; H04N 9/64

[56] References Cited

U.S. PATENT DOCUMENTS

| Re. 32,457 | 7/1987 | Matey ............................ 358/342 |
|---|---|---|
| 3,740,465 | 6/1973 | Dorsey ........................... 348/725 |
| 4,453,186 | 6/1984 | Watatani et al. ............... 358/341 |
| 5,164,841 | 11/1992 | Takahashi ..................... 358/341 |
| 5,220,555 | 6/1993 | Yanagisawa et al. .......... 369/126 |
| 5,260,926 | 11/1993 | Kuroda et al. ................. 369/126 |
| 5,373,494 | 12/1994 | Kawagishi ..................... 369/126 |

FOREIGN PATENT DOCUMENTS

| 518283 | 12/1992 | European Pat. Off. ............ 369/126 |
|---|---|---|
| 61-80536 | 4/1986 | Japan ............................ G11B 9/00 |
| 62-281138 | 12/1987 | Japan ............................ G11B 9/00 |
| 63-161552 | 7/1988 | Japan ............................ G11B 9/00 |
| 63-161553 | 7/1988 | Japan ............................ G11B 9/00 |

OTHER PUBLICATIONS

Physical Review Letters, vol. 49, No. 1, Jul. 5, 1982, "Surface Studies By Scanning Tunneling Microscopy", G. Binning, H. Rohrer, Ch. Gerber, and E. Weibel.

*Primary Examiner*—James J. Groody
*Assistant Examiner*—Chris Grant
*Attorney, Agent, or Firm*—Fitzpatrick, Cella, Harper & Scinto

[57] ABSTRACT

A digital television receiver having an STM memory is provided with a receiving unit to receive a broadcasting signal, a producing circuit to produce an image signal and a voice signal from the received broadcasting signal, a memory which is used to record the image signal and the voice signal and has a plurality of probe electrodes and a recording medium arranged so as to face the probe electrodes, a display for converting the image signal outputted from the memory into the video image, and a speaker for converting the voice signal outputted from the memory into the voice sound. The memory further has a voltage applying circuit for applying a voltage to the portion between each probe electrode and the recording medium. The image signal and the voice signal are digital signals.

3 Claims, 8 Drawing Sheets

TELEVISION RECEIVER HAVING AN STM MEMORY

BACKGROUND OF THE INVENTION

1. Field of the Invention

The invention relates to a television receiver and, more particularly, to a digital television receiver.

2. Related Background Art

In recent years, a memory is the nucleus of the electronics industries such as computer, computer concerned equipment, video disc, digital audio disc, and the like. The development of a memory material is extremely actively executed. Although the performance required for the memory differs depending on the application, a high response speed in recording or reproduction is indispensable. Hitherto, a semiconductor memory made by a material of semiconductor or a magnetic memory made by a magnetic material is a main memory. In recent years, however, a cheap recording medium of a high density by means of an optical memory using an organic thin film such as organic pigment, photopolymer, or the like has been proposed with the advancement of the laser technique.

On the other hand, a scanning tunneling microscope (STM) capable of directly observing an electron structure of the surface atom of a conductor has been developed. A wide application is expected because of the following reasons (G. Binning et al., "Phys. Rev. Lett.", 49, 57, 1982).

(1) A real space image can be observed at a high resolution irrespective of a monocrystal or amorphous.

(2) There is an advantage such that the real space image can be observed at a low electric power without giving a damage by a current to a sample.

(3) The STM can be operated even in the atmosphere and can be used for various kinds of materials.

According to the scanning tunneling microscope, in a state in which a voltage is applied between the probe (metal probe) and the conductive material, when the probe is allowed to approach a position of a distance of about 1 nm from the surface of the conductive material, a tunneling current flowing between the probe and the surface of the conductive material is used. The magnitude of the tunneling current is very sensitive to the distance between the probe and the surface of the conductive material, and exponentially functionally varies in response to such a change in distance. Therefore, the probe is relatively and two-dimensionally scanned over the surface of the conductive material while the distance between the probe and the surface of the conductive material is controlled so as to keep the tunneling current constant, whereby the surface structure (concave and convex portions of the surface) of the real space of the conductive material can be measured. Various kinds of information regarding all of the electron clouds of the surface atoms can be also read. A resolution in the in-plane direction of the conductive material at this time is equal to about 0.1 nm.

By applying the principle of the scanning tunneling microscope, high density recording and reproduction can be executed sufficiently on the atomic order (subnanometer). For example, in a recording and/or reproducing apparatus disclosed in Japanese Patent Laid-Open Application No. 61-80536, by eliminating the atomic particles adsorbed on the surface of the recording medium by an electron beam or the like, recording information (data) is recorded (written) or the recorded information is reproduced (read out) by the scanning tunneling microscope. There has also been proposed a method whereby a thin film layer of a material (for instance, organic compound or chalcogen compound class having a conjugate $\pi$ electron system) having a memory effect to the switching characteristics of a voltage current is used as a recording layer and the recording and reproduction are executed by the scanning tunneling microscope (refer to Japanese Patent Laid-Open Application No. 63-161552, Japanese Patent Laid-Open Application No. 63-161553). According to this method, when a size of recording bit is set to 10 nm, the recording and reproduction of a large capacity of up to $10^{12}$ bits/cm$^2$ can be performed.

As a scanning mechanism of the probe, a cantilever type has been proposed (Japanese Patent Laid-Open Application No. 62-281138). Several tens of cantilever type scanning mechanisms made by $SiO_2$ having a length of 100 µm, a width of 10 to 20 µm, and a thickness of about 0.5 µm can be formed on the same silicon substrate. A writing circuit and a reading circuit are also integrated on the same silicon substrate.

In recent years, digitization of television receivers and video tape recorders (VTR) is being progressed. As reasons of it, the advancement of the recent digital technique and the pursuit of high image quality and high sound quality at the level of industrial articles can be mentioned. That is, in the conventional analog recording, there are limitations of the S/N ratio and waveform distortion of the reproduction signal, and limitations are given to the picture quality of the reproduced image and the sound quality of the reproduced voice. In the digital recording, however, the picture quality of the reproduced image and the sound quality of the reproduced voice are determined by only the A/D converting characteristics and the D/A converting characteristics and are not directly influenced by the characteristics of the tape and head, so that those qualities are remarkably improved. Further, by providing a memory, the delay of signal or the like can be easily performed. Therefore, the elimination of noises such as ghost or the like and the improvement of the picture quality by a non-interlacing system or the like which are fundamentally based on the arithmetic operation of numerical value data can be also realized. With respect to the advancement of the digital technique, the realization of a high processing speed of the circuit is progressed due to the advancement of the semiconductor technique and an A/D converting speed is remarkably improved. Therefore, it is also possible to sample at a frequency of about 100 MHz. In association with it, an arithmetic operating speed of the semiconductor device is also extremely so high to be 1 nsec per gate and more complicated image processes can be also executed at a high speed.

A high picture quality and a high sound quality are realized by the above digitization in a television receiver and various functions are added as accessories. For example, a 2-picture plane display, a multi-picture plane display, a still image display, a frame dropping display, and the like can be mentioned as main functions. A recording capacity of up to a few fields or a few frames is enough to execute signal processes which are necessary for such functions from a viewpoint of a recording capacity. A target to be processed is also limited to only the image signal of one channel from a problem of transfer speed.

In the television signal of the existing NTSC system, since a frequency band of the image signal is limited to 4.2 MHz, a frequency of about 14 MHz is needed as a sampling frequency of the image signal. Therefore, now assuming that the number of quantization bits is set to 8 bits, in the case where the image signal was sampled as it is, a data transfer speed of 110 Mbps or more is needed. Even if the image signal was properly compressed, a data transfer speed of about 20 Mbps is necessary.

As mentioned above, since a very large recording capacity and a high data transfer speed are necessary to record the image signal, a memory of an extremely large recording capacity is necessary in order to execute the signal process of a long time base. For example, even in case of using a magnetooptic disc or a laser disc, which are at present general recording media of a high density, in order to record the image signal of 10 channels at a data transfer speed of 20 Mbps for about one hour, 500 or more magnetooptic discs are necessary and its data transfer speed is equal to 200 Mbps. It is, consequently, very difficult to use such a recording medium as a buffer memory.

SUMMARY OF THE INVENTION

It is an object of the invention to provide a digital television receiver having buffer memory means having a large recording capacity and a high data transfer speed which are enough to execute signal processes of a time base longer than that in the conventional one.

The above object is accomplished by a television receiver being provided with: receiving means for receiving a broadcasting signal, producing means for producing an image signal and a voice signal from the received broadcasting signal; memory means which is used to store the image signal and the voice signal and includes a plurality of probe electrodes and a recording medium arranged so as to face the plurality of probe electrodes; display means for converting the image signal generated from the memory means into the video image; and speaker means for converting the voice signal outputted from memory means into a voice sound.

DETAILED DESCRIPTION OF THE PREFERRED EMBODIMENTS

An embodiment of the invention will now be described hereinbelow with reference to the drawings.

Figure 1:
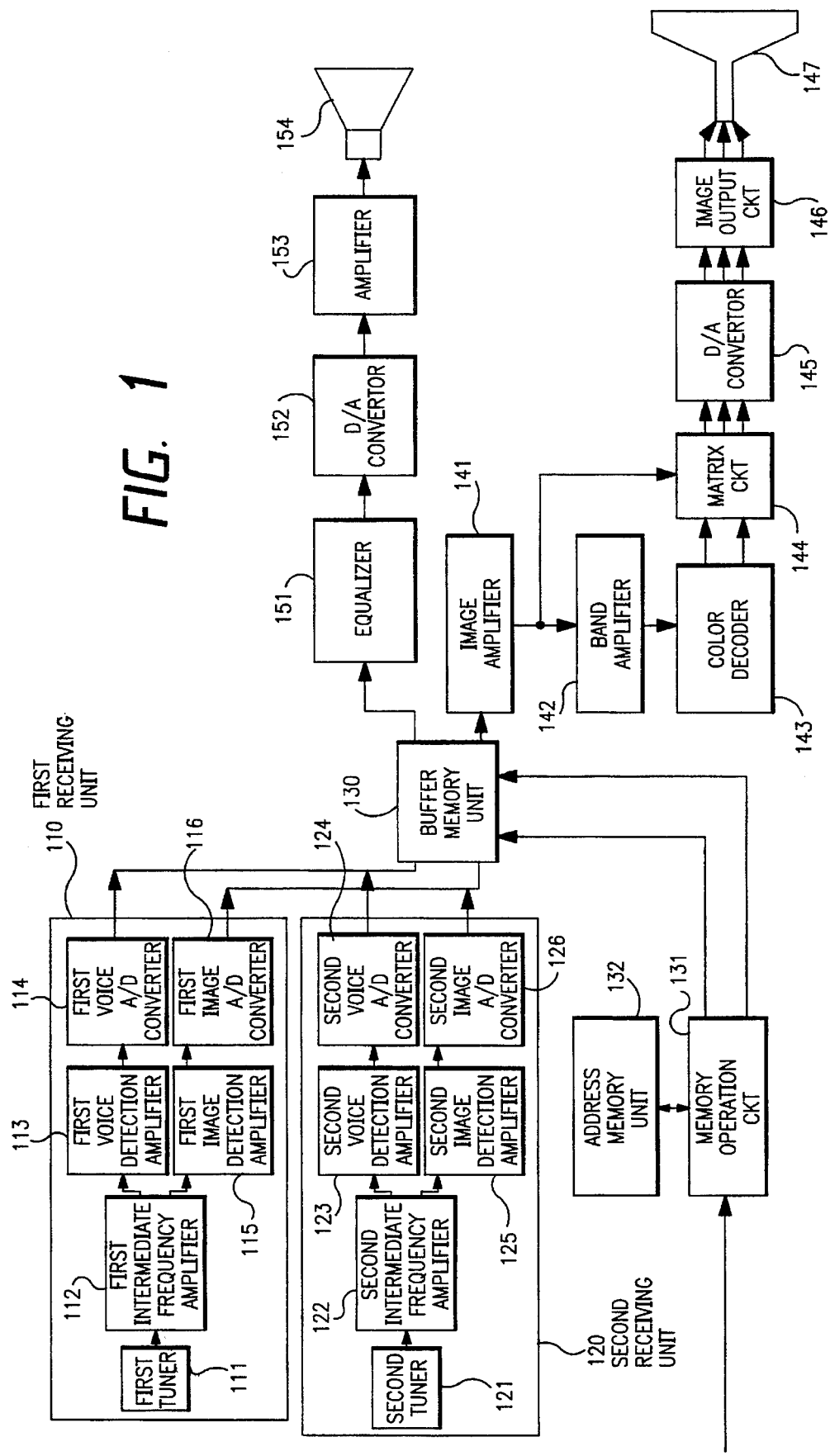
FIG. 1 is a block diagram showing a fundamental construction of an embodiment of a digital television receiver of the invention.

FIG. 1 is a block diagram showing a fundamental construction of an embodiment of a digital television receiver according to the invention.

A digital television receiver 100 includes a receiving unit, a memory unit, an image signal processing unit, and a voice signal processing unit. Each of the component elements of the digital television receiver 100 will now be described in detail hereinbelow.

(1) Receiving unit

The receiving unit is provided with six receiving units (only a first receiving unit 110 and a second receiving unit 120 are shown) each for receiving various kinds of broadcasting signals (NTSC television signals) such as VHF broadcasting signal, UHF broadcasting signal, satellite broadcasting signal, output signal of a CATV converter, and the like. This is because the simultaneous reception of six channels is made possible since the simultaneous recording in six channels is main stream and one receiving unit is necessary per channel. In the embodiment, however, only the two receiving units 110 and 120 among them will now be described for simplicity of the explanation.

The first receiving unit 110 is provided with: a first tuner 111 for receiving various kinds of broadcasting signals and converting into a first intermediate frequency signal; a first intermediate frequency amplifier 112 for separating the first intermediate frequency signal received from the first tuner 111 into a first image intermediate frequency signal and a first voice intermediate frequency signal and for amplifying the separated signals; a first voice detection amplifier 113 for detecting and amplifying the first voice intermediate frequency signal received from the first intermediate frequency amplifier 112 and for converting into the first analog voice signal; a first voice A/D converter 114 for receiving the first analog voice signal from the first voice detection amplifier 113 and converting into the first digital voice signal of 16 bits; a first image detection amplifier 115 for detecting and amplifying the first image intermediate frequency signal received from the first intermediate frequency amplifier 112 and converting into the first analog image signal; and a first image A/D converter 116 for receiving the first analog image signal from the first image detection amplifying circuit 115 and converting into the first digital image signal of eight bits.

The second receiving unit 120 is provided with: a second tuner 121 for receiving various kinds of broadcasting signals and converting into a second intermediate frequency signal; a second intermediate frequency amplifier 122 for separating the second intermediate frequency signal received from the second tuner 121 into a second image intermediate frequency signal and a second voice intermediate frequency signal and amplifying; a second voice detection amplifier 123 for detecting and amplifying the second voice intermediate frequency signal received from the second intermediate frequency amplifier 122 and converting into the second analog voice signal; a second voice A/D converter 124 for receiving the second analog voice signal from the second voice detection amplifier 123 and converting into the second digital voice signal of 16 bits; a second image detection amplifier 125 for detecting and amplifying the second image intermediate frequency signal received from the second intermediate frequency amplifier 122 and converting into the second analog image signal; and a second image A/D converter 126 for receiving the second analog image signal from the second image detection amplifier 125 and converting into the second digital image signal of 8 bits.

Sampling frequencies of the first and second voice A/D converters 114 and 124 are set to 44.056 kHz. Sampling frequencies of the first and second image A/D converters 116 and 126 are equal to about 15 MHz. Therefore, data transfer speeds of both of the first and second digital image signals are equal to 120 Mbps.

(2) Memory unit

The memory unit is provided with a buffer memory unit 130, a memory operation circuit 131, and an address memory unit 132. The writing and reading operations of the buffer memory unit 130 are controlled by an operation control signal which is supplied from the memory operation circuit 131 and address information. The memory operation circuit 131 analyzes an operation instruction of an operator which is sent from the outside and performs the address control of the buffer memory unit 130. The address memory unit 132 stores various kinds of address information for address control of the buffer memory unit 130. The memory operation circuit 131 generates the operation control signal on the basis of the various kinds of address information stored in the address memory unit 132. A structure and the operation of the buffer memory unit 130 will be described in detail hereinbelow.

(3) Image signal processing unit

The image signal processing unit is provided with: an image amplifier 141, a band amplifier 142, a color decoder 143, and a matrix circuit 144 for converting the digital image signal for the output image which is outputted from the buffer memory unit 130 into three digital chrominance signals (digital red signal, digital green signal, and digital blue signal); an image D/A converter 145 for converting the digital red signal, digital green signal, and digital blue signal received from the matrix circuit 144 into the analog red signal, analog green signal, and analog blue signal, respectively; an image output circuit 146 for amplifying the analog red, green, and blue signals received from the D/A converter 145; and an image receiving tube 147 for displaying the image corresponding to the red, green, and blue signals amplified by the image output circuit 146.

(4) Voice signal processing unit

The voice signal processing unit is provided with: an equalizer 151 to which a digital voice signal for an output voice is supplied from the buffer memory unit 130; a voice D/A converter 152 for converting the digital voice signal received from the equalizer 151 into the analog voice signal; an amplifier 153 for amplifying the voice signal received from the D/A converter 152; and a speaker 154 to convert the voice signal amplified by the amplifier 153 into the voice sound.

A construction of the buffer memory unit 130 will now be described with reference to FIG. 2.

The buffer memory unit 130 includes buffer memory means 200. As shown in FIG. 2, the buffer memory means 200 is provided with a compression circuit 201; a buffer memory input/output control circuit 202; an information recording circuit 203; first to 1920th probe units $204_1$ to $204_{1920}$ (one probe is provided for one probe unit); an information reading circuit 205; an expansion circuit 206; an image construction circuit 207; a scan control circuit 208; a stage unit 209; an image input terminal 210; a voice input terminal 211; an image output terminal 212; a voice output terminal 213; an operation control signal input terminal 214; an address information input terminal 215; multiprobe heads (not shown) for supporting the probe units $204_1$ to $204_{1920}$; and the recording medium 10 (refer to FIG. 3).

The first to 1920th probe units $204_1$ to $204_{1920}$ are classified into six groups every 320 probe units. 320 probe units (320 probes) are assigned to one receiving unit. A stage 216 (refer to FIG. 3) which is controlled by the scan control circuit 208 is provided for the stage unit 209.

The compression circuit 201 receives the first and second digital image signals from the first and second receiving units 110 and 120 through the image input terminal 210, respectively. The compression circuit 201 also receives the first and second digital voice signals from the first and second receiving units 110 and 120 through the voice input terminal 211, respectively. The compression circuit 201 executes data-compression in which, for example, a differential pulse modulating method (DSPM) and a dither method are combined, thereby converting the data transfer speeds of the first and second digital image signals from 120 Mbps into 20 Mbps.

The buffer memory input/output control circuit 202 synthesizes the data-compressed first digital image signal and first digital voice signal which have been received from the compression circuit 201 and forms first write data. The control circuit 202 also synthesizes the second digital image signal and the second digital voice signal which have been data-compressed and received from the compression circuit 201 and forms second write data. The buffer memory input/output control circuit 202 generates a control signal to instruct the probe units (for example, the first to 320th probe units $204_1$ to $204_{320}$ with respect to the first write data; the 321st to 640th probe units $204_{321}$ to $204_{640}$ with respect to the second write data) which are used when writing to the information recording circuit 203.

The information recording circuit 203 forms first and second voltage pulse trains (first and second voltages for recording) according to the first and second write data received from the buffer memory input/output control circuit 202. After that, the recording circuit 203 generates the first and second voltage pulse trains to the probe units instructed by the control signal received from the buffer memory input/output control circuit 202, respectively.

The information reading circuit 205 forms read data from the tunneling current signals received from the probe units (for example, the first to 320th probe units $204_1$ to $204_{320}$) instructed by the buffer memory input/output control circuit 202.

The control circuit 202 separates the data-compressed first digital image signal and first voice signal or the data-compressed second digital image signal and second voice signal from the read data received from the information reading circuit 205.

The expansion circuit 206 interpolates the data-compressed first or second digital image signal received from the control circuit 202 and returns the data-compressed first or second digital image signal to the first or second digital image signal before the data-compression.

The image construction circuit 207 assembles the first and second digital image signals received from the expansion circuit 206 in accordance with an output image format (for example, output format such as a multipicture planes or the like), thereby forming a digital image signal for an output image. The image construction circuit 207 assembles the first and second digital voice signals received from the expansion circuit 206 in accordance with the output image format, thereby forming a digital voice signal for an output voice. The digital image signal for output image and the digital voice signal for output voice are outputted to the outside through the image output terminal 212 and voice output terminal 213. In this instance, the output image format is designated by an operation control signal which is inputted from the memory operation circuit 131 (refer to FIG. 1) through the operation control signal input terminal 214.

The image construction circuit 207 is also connected to the image input terminal 210 and voice input terminal 211 and can also fetch the real-time digital image signal and digital voice signal, so that the picture plane which is at present being broadcasted can be also seen on the same picture plane as the reproduced picture plane.

The buffer memory input/output control circuit 202 executes the switching between the writing operation and the reading operation and the control of the scan control circuit 208. The switching between the writing and reading operations is executed by the operation control signal which is inputted from the memory operation circuit 131 through the operation control signal input terminal 214. In this instance, a reading position on the recording medium is produced also with reference to the address information which is inputted through the address information input terminal 215 and the information of the reading position is sent to the scan control circuit 208.

The scan control circuit 208 moves the stage 216 (refer to FIG. 3) attached to the stage unit 209 to the reading position in accordance with the information of the reading position received from the control circuit 202.

A construction of one probe will now be described with reference to FIG. 3 with respect to a construction of the first probe $230_1$ as an example.

Figure 3:
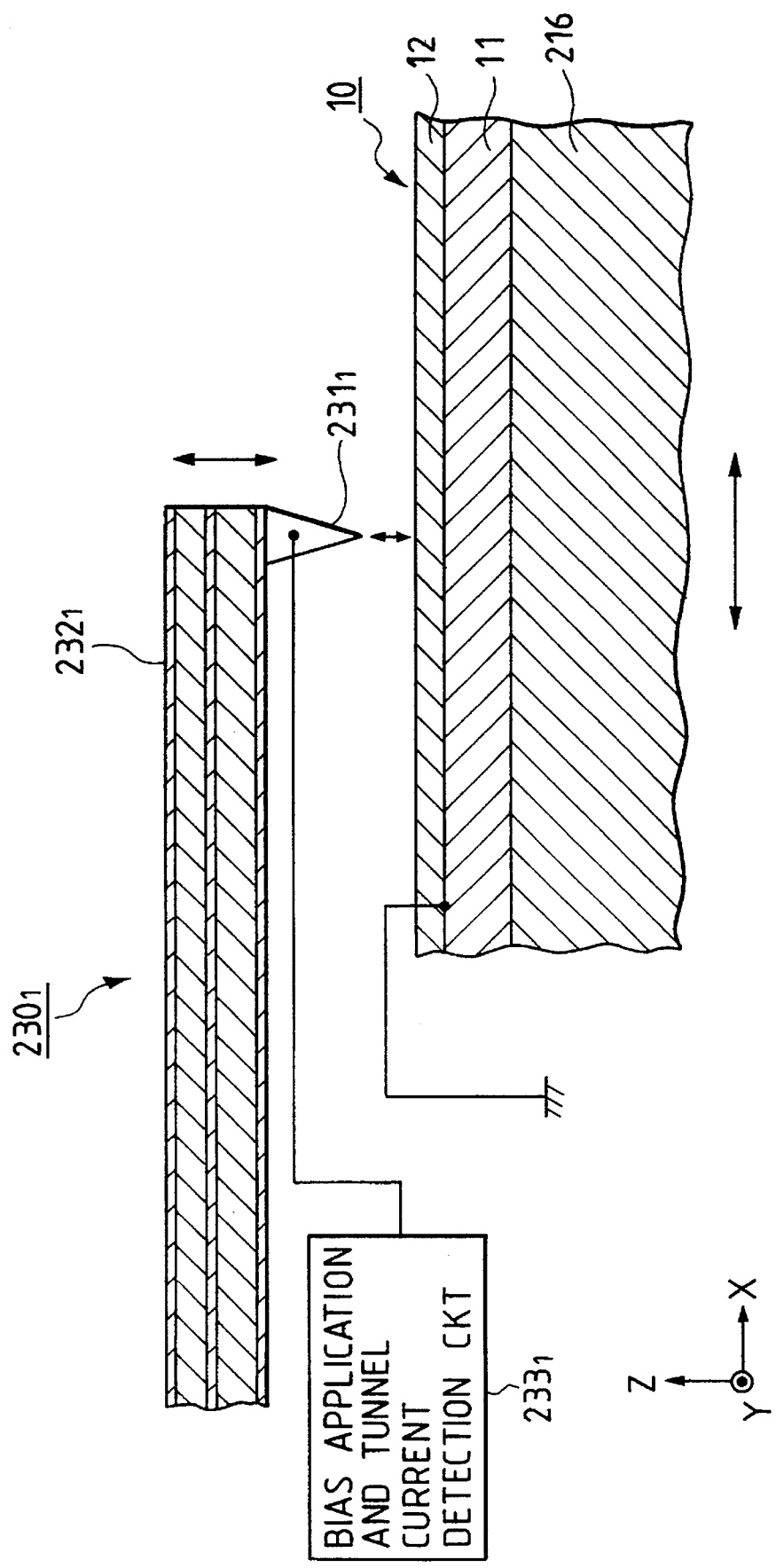
FIG. 3 is a schematic constructional diagram showing a construction of a first probe.

As shown in FIG. 3, the first probe $230_1$ is provided with: a probe $231_1$; a cantilever type actuator $232_1$ which uses a Bimorph piezoelectric element and in which the probe $231_1$ is attached to the tip; and a bias application and tunneling current detection circuit $233_1$ for applying a bias voltage to the probe $231_1$ and for detecting a tunneling current flowing between the probe $231_1$ and the recording medium 10. The recording medium 10 is provided with a substrate electrode 11 and a recording film 12 formed on the substrate electrode 11, and is put on the stage 216.

The distance between the probe $231_1$ and the recording medium 10 is controlled by a control mechanism (not shown) to a distance such that the tunneling current can be detected. The stage 216 is moved in the X-axis direction and the Y-axis direction by a driving mechanism (not shown) which is constructed by a laminating type piezoelectric actuator or the like. Due to this, the probe $231_1$ is relatively scanned over the recording medium 10.

Write data is recorded onto the recording medium 10 by applying a voltage pulse train from the information recording circuit 203 (refer to FIG. 2) to a portion between the probe $231_1$ and the recording medium 10 through the probe unit. That is, for example, in the case where an SOAZ Langmuir-Blodgett's double-layer film laminated on an Au electrode as shown in Japanese Patent Laid-Open Application No. 63-161552 and Japanese Patent Laid-Open Application No. 63-161553 is used as a recording medium 10, a voltage pulse train in which continuous pulse waves of +1.5 V were multiplexed to a bias voltage of a peak value of −6 V is applied between the probe $231_1$ and the recording medium 10 and recording bits are formed on the recording medium 10, thereby recording the write data onto the recording medium 10. The write data is reproduced from the recording medium 10 by detecting a tunneling current which occurs when the probe $231_1$ approaches the recording medium 10. The remaining second to 1920th probes $230_2$ to $230_{1920}$ are also similarly constructed.

Figure 2:
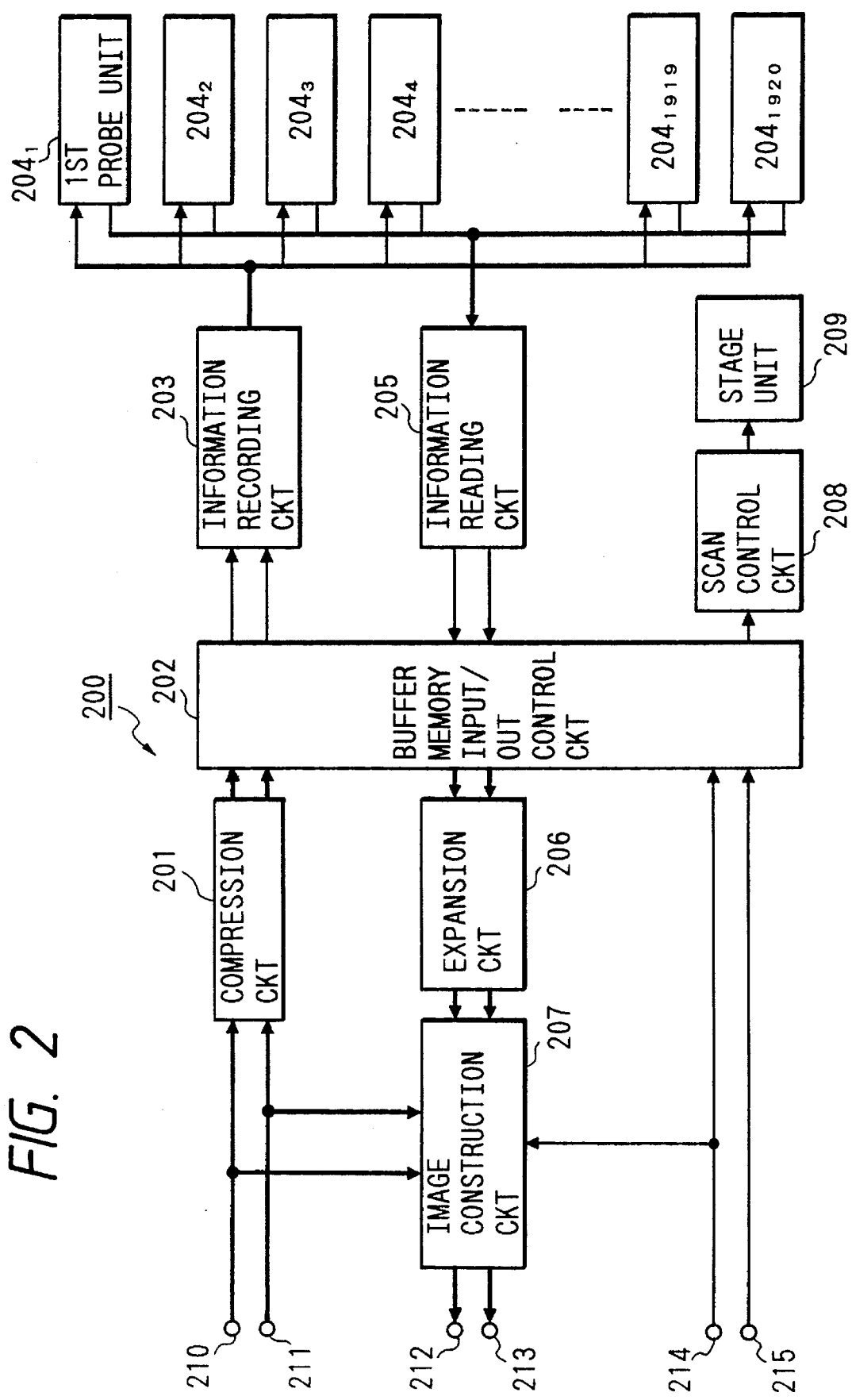
FIG. 2 is a block diagram showing a construction of buffer memory means constructing a buffer memory 130 shown in FIG. 1.

Therefore, by constructing the buffer memory means 200 shown in FIG. 2 so as to have 1920 probes each having the construction shown in FIG. 3, for example, when it is now assumed that a scanning frequency of the probe $231_1$ for the recording medium 10 is set to 500 Hz and a main scan width is set to 1 μm and the write data is written to the recording medium 10 at a recording density such that a bit diameter of recording bit is equal to 5 nm and a bit interval is equal to 10 nm, the recording and reproducing speeds of 192 Mbps as a whole and of 100 kHz per one probe can be accomplished.

The operation in the recording mode of the buffer memory means 200 of the buffer memory unit 130 as a main constructional section of the digital television receiver 100 will now be described with reference to FIGS. 2 to 5.

The first digital image signal which is outputted from the first receiving unit 110 and the second digital image signal which is outputted from the second receiving unit 120 are supplied to the compression circuit 201 through the image input terminal 210 of the buffer memory means 200, respectively. The compression circuit 201 data is provided with the first and second digital image signals by a data-compressing method in which a differential pulse modulating method and a dither method are combined, so that the data transfer speed of each of the first and second digital image signals is changed from 120 Mbps to 20 Mbps.

Figure 4:
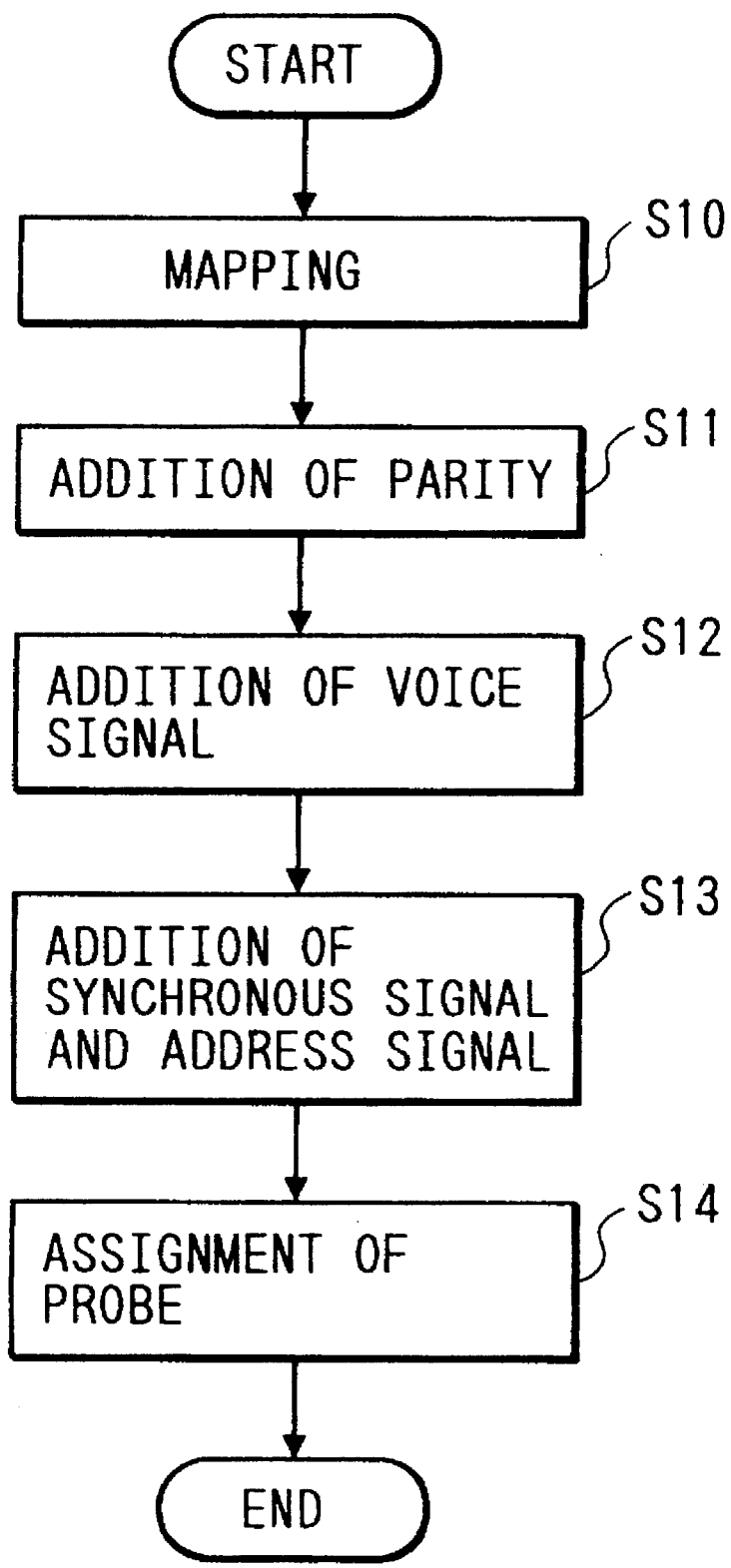
FIG. 4 is a flowchart for explaining the operation upon recording of buffer memory means shown in FIG. 2.
Figure 5:
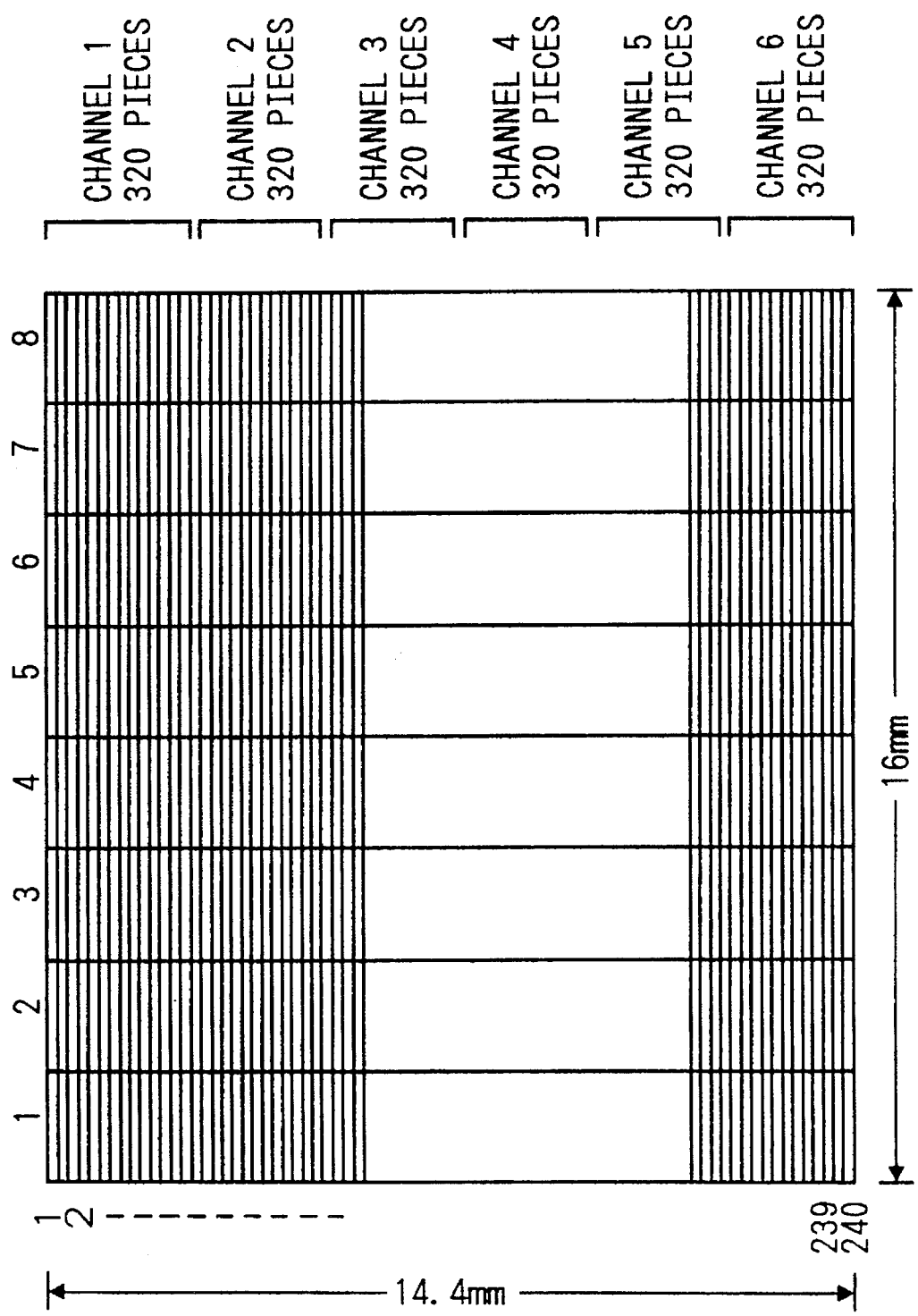
FIG. 5 is a diagram for explaining the operation in the recording mode of the buffer memory means shown in FIG. 2 and for explaining a range which is allocated to each probe.

The buffer memory input/output control circuit 202 maps the first digital image signal which has been data-compressed by the compression circuit 201 by a weight signal according to the signal level (step S10 in FIG. 4). That is, the signal of a small level is converted into the digital signal of a small weight (the number of "0" is large). Due to this, even when a bit error occurs, a large level change can be avoided to a certain extent. After that, a Reed Solomon code of four pixels is added as a parity every 60 pixels. Those parities are set to a row and are combined every 60 rows, thereby forming a matrix, and the Reed Solomon code of four pixels is also added as a parity for 60 pixels in the column direction (step S11 in FIG. 4). Such a matrix of (64×64) formed as mentioned above is set to a row unit and the digital signal is generated. After that, the first digital voice signal (8 bits) inputted from the first receiving unit 110 to the first buffer memory means 200 through the voice input terminal 211 is added to the end portion of 64 pixels (corresponding to one row) of the generated digital signal (step S12 in FIG. 4). After that, a synchronous signal (16 bits) and an address signal (32 bits) are added to the head portion of 64 pixels (one row) of the generated digital signal (step S13 in FIG. 4). Thus, the first write data in which 71 pixels are set to one unit is produced.

The second write data is also similarly produced by the buffer memory input/output control circuit 202 by using the second digital image signal which has been data-compressed by the compression circuit 201 and the second digital voice signal (8 bits) supplied from the second receiving unit 120 to the compression circuit 201 through the voice input terminal 211 of the buffer memory means 200.

The first and second write data are sent from the control circuit 202 to the information recording circuit 203. The recording circuit 203 converts the first and second write data into the first and second voltage pulse trains, respectively. Each of the first and second voltage pulse trains is multiplexingly distributed to the 320 probes which were allocated to each receiving unit. That is, the first voltage pulse train is distributed to the first to 320th probe units $204_1$ to $204_{320}$. The second voltage pulse train is distributed to the 321st to 640th probe units $204_{321}$ to $204_{640}$. In this instance, the range which is allocated to one probe is one small area shown in FIG. 5. Therefore, the multiplexing process is executed in the 320 probe units and a writing speed is set to 100 kbps per probe (32 Mbps per channel). Since the buffer memory means 200 of the embodiment has 1920 probe units $204_1$ to $204_{1920}$, the image data of six channels can be simultaneously recorded.

The operation in the reproducing mode of the buffer memory means 200 will now be described with reference to FIGS. 2 to 6.

Figure 6:
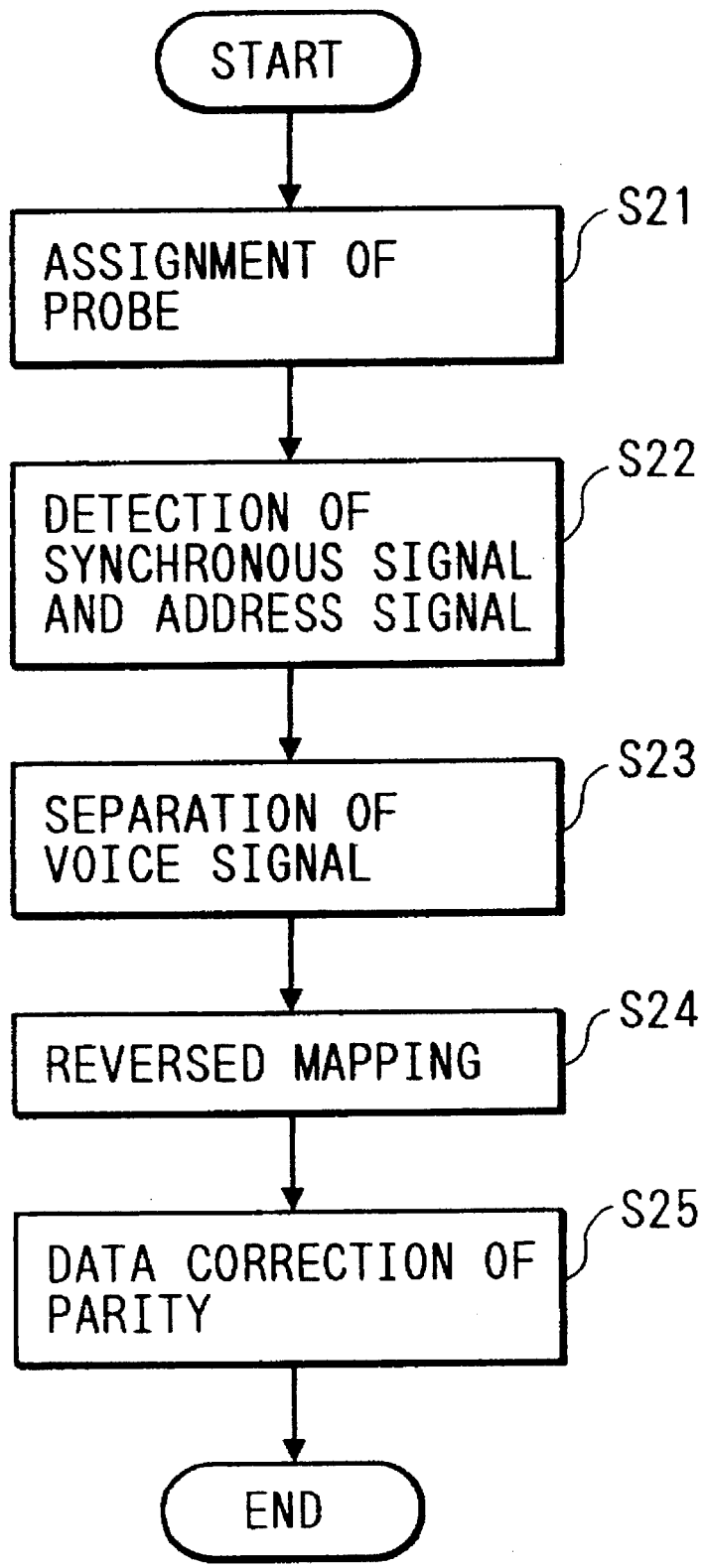
FIG. 6 is a flowchart for explaining the operation in the reproducing mode of the buffer memory means shown in FIG. 2.

In the reproducing mode, probes which are used for reproduction are allocated in the buffer memory input/output control circuit 202 (step S21 in FIG. 6). Now, assuming that the first to 320th probes $230_1$ to $230_{320}$ are allocated, a tunneling current signal corresponding to the tunneling current flowing between each of the first to 320th probes $230_1$ to $230_{320}$ and the recording medium 10 is sent to the information reading circuit 205. The first read data (bit train) corresponding to the first write data is produced by the tunneling current signal. The read data formed is sent from the information reading circuit 205 to the control circuit 202. The detection of the sync signal and address signal (step S22 in FIG. 6), the separation of the voice signal (step S23 in FIG. 6), the reversed mapping (step S24 in FIG. 6), and the data correction by the parity (step S25 in FIG. 6) are sequentially executed, so that the first digital image signal and first digital voice signal which have been data-compressed, are separated. The reading speed in this instance is also set to 100 kbps per probe which is the same as the writing speed. The first digital image signal and first digital voice signal which were data compressed and separated are sent from the control circuit 202 to the expansion circuit 206. The expansion circuit 206 interpolates the data compressed first digital image signal, thereby returning to the first digital image signal before the data compression. After that, the first digital image signal and first digital voice signal are sent from the expansion circuit 206 to the image construction circuit 207.

In the case where the 321st to 640th probes $230_{321}$ to $230_{640}$ are allocated, the second digital image signal and the second digital voice signal are similarly sent from the expansion circuit 206 to the image construction circuit 207.

The image construction circuit 207 assembles the first and second digital image signals in accordance with an output image format, thereby forming a digital image signal for an output image. Since the first and second digital voice signals are assembled in accordance with the output image format, a digital voice signal for an output voice is formed. The digital image signal for the output image and the digital voice signal for the output voice are outputted from the image output terminal 212 and voice output terminal 213, respectively.

Figure 7:
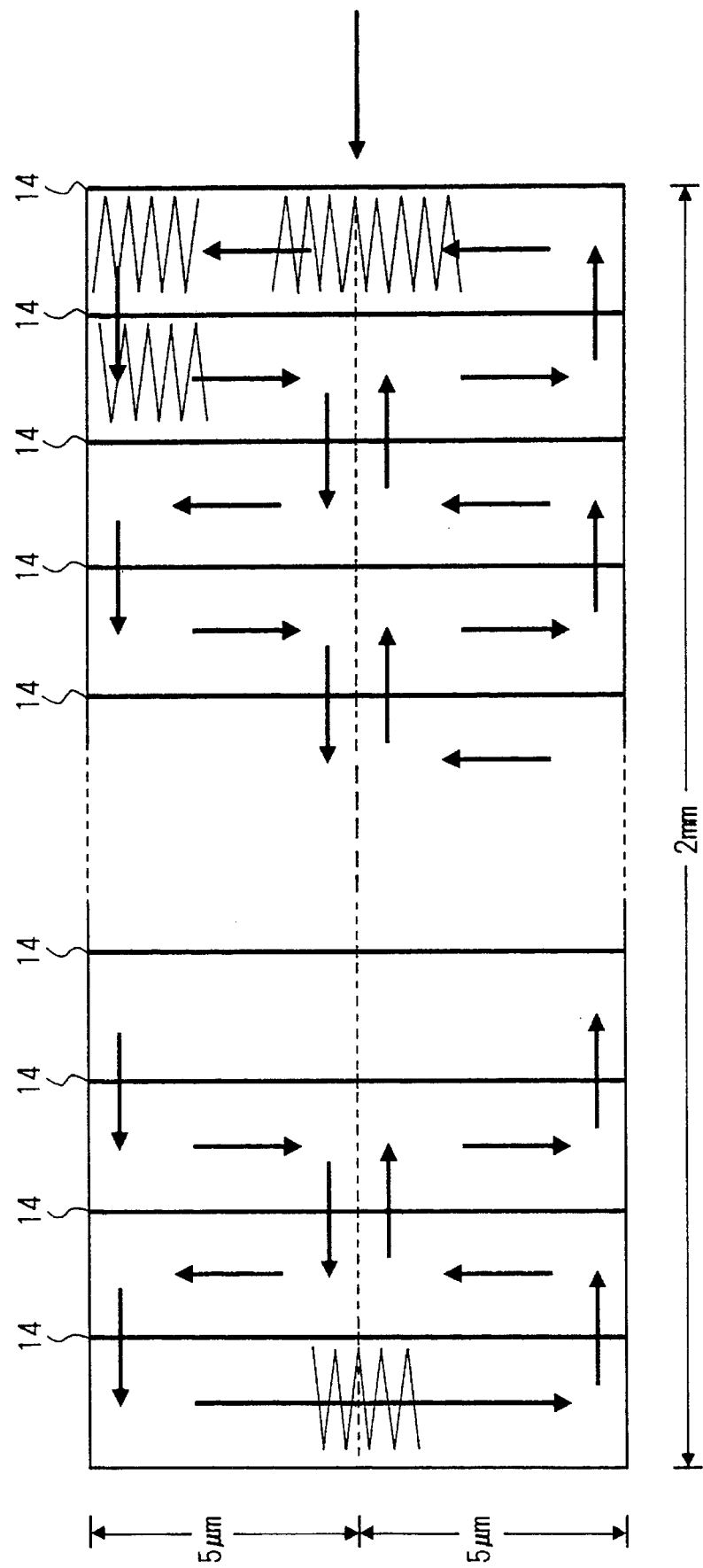
FIG. 7 is a diagram for explaining a path along which the first probe shown in FIG. 3 scans in each area of a recording medium.

A scan path in the area of one probe will now be described with reference to FIG. 7 with respect to a path along which the probe $231_1$ of the first probe $230_1$ scans in each area of the recording medium 10 as an example.

In case of writing the write data along a track groove 14 formed on the recording medium 10, the main scan of the probe $231_1$ is executed in the direction (X-axis direction shown in the diagram) perpendicular to the track groove 14 and the sub scan of the probe $231_1$ is performed in the direction (Y-axis direction shown in the diagram) of the track groove 14. However, the main scan and sub scan of the probe $231_1$ are executed in accordance with the order as shown by arrows in the diagram. That is, now assuming that a whole scan width in the Y-axis direction in the diagram is equal to 10 μm, the scan width in the Y-axis direction in the diagram is divided by 5 μm and the upper area in the diagram is set to a going scan and the lower area in the diagram is set to a returning scan. Due to this, an endless memory is constructed. A width in the X-axis direction of the area is equal to about 2 mm. In case of a recording rate of 100 kHz, the image data can be recorded for about one hour.

Figure 8A:
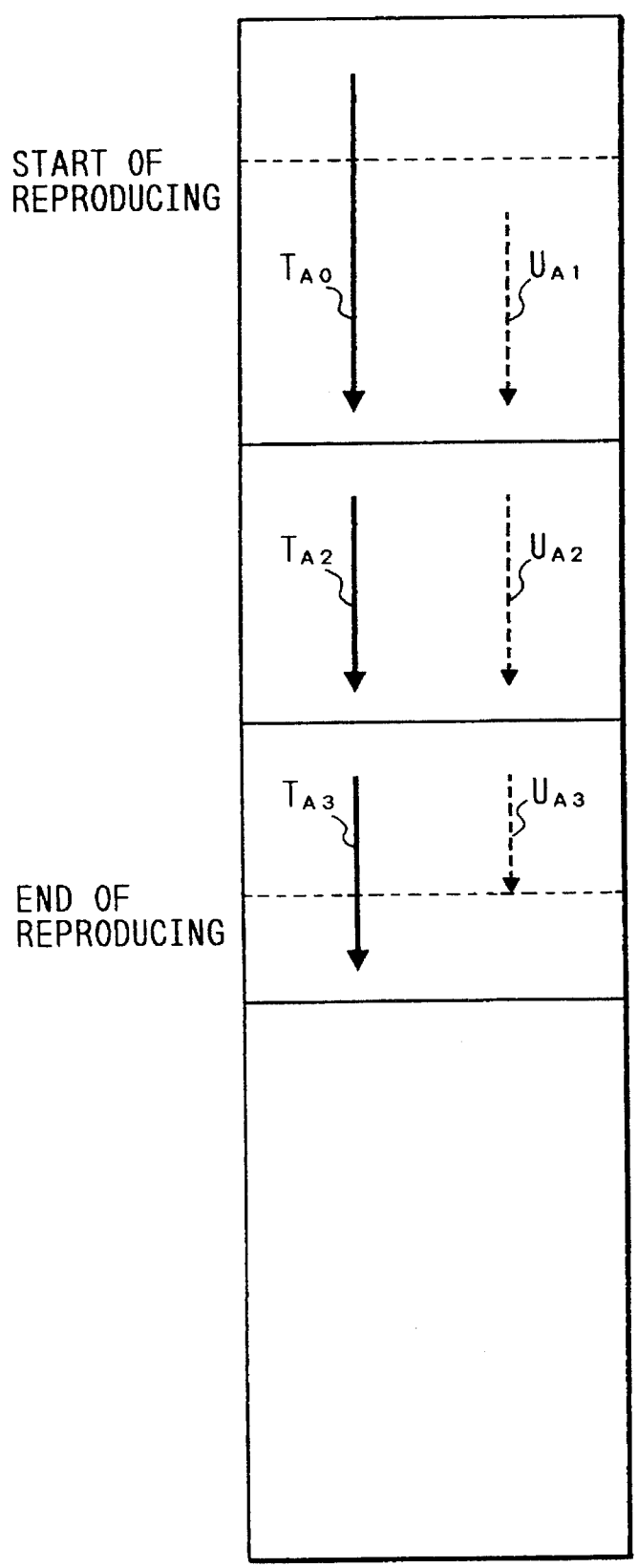
FIGS. 8A and 8B are diagrams for explaining a method of simultaneously executing the writing and reading operations in a buffer memory unit shown in FIG. 1.
Figure 8B:
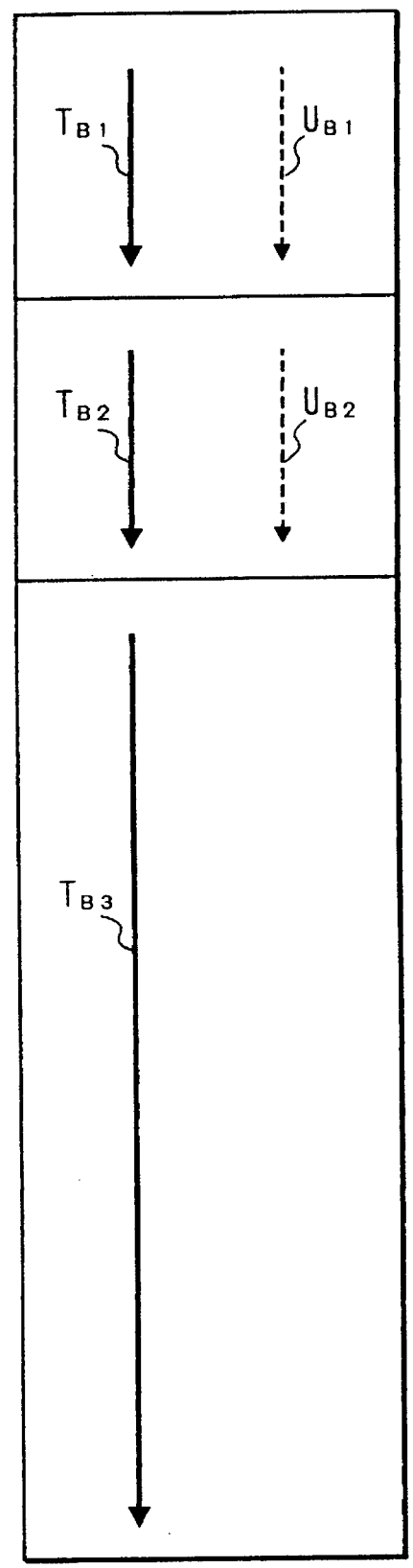

A method of simultaneously executing the writing and reading operations in the buffer memory unit 130 will now be described with reference to FIGS. 8A and 8B.

In case of this method, two buffer memory means 200 having the same construction are provided for the buffer memory unit 130. That is, when one buffer memory means is used for the writing operation, the other buffer memory means is used for the reading operation. In this instance, the switching between the buffer memory means which is used for the writing operation and the buffer memory means which is used for the reading operation is performed as follows.

In a state in which only the recording operation is executed, the writing operation in one buffer memory means (hereinafter, referred to as first buffer memory means) is executed (arrow $T_{A0}$ shown by a solid line in FIG. 8A). After that, when the reproducing operation is started during the writing operation, the reading operation is executed from the reproduction start position in the first buffer memory means (arrow $U_{A1}$ shown by a broken line in FIG. 8A) which has been performing the writing operation till now. At the same time, the writing operation in the other buffer memory means (hereinafter, referred to as a second buffer memory means) is started (arrow $T_{B1}$ shown by a solid line in FIG. 8B). After that, when the reading operation of the portion in which the writing operation was performed in the first buffer memory means is fully finished, the reading operation cannot be executed in the first buffer memory means, so that the reading operation in the second buffer memory means is started (arrow $U_{B2}$ shown by a broken line in FIG. 8B). At the same time, the writing operation is started in the first buffer memory means (arrow $T_{A2}$ shown by a solid line in FIG. 8A). By repeating the similar operations till the reproduction end position, the writing operation and the reading operation are simultaneously executed in the buffer memory unit 130. With respect to the switching position of the first and second buffer memory means, by storing the address information into the address memory unit 132 shown in FIG. 1, such a switching position is managed by the memory operation circuit 131. Therefore, the same reading operation can be also again performed.

The digital television receiver 100 in the embodiment is constructed as mentioned above, so that there are the following advantages.

(1) Since at least six receiving units are provided, the images of six channels can be recorded or reproduced in a lump at a super high data transfer speed of about 200 Mbps as a whole.

(2) Since a recording capacity is very large and the image data in each channel can be simultaneously digitally recorded for one hour or more, a video image of a very high picture quality can be seen and enjoyed while deviating the time base without executing troublesome recording operation of the video tape recorder (VTR) or the like. That is, for example, since a program of a certain channel of one hour before can be seen in back, a half-way program can be enjoyed from the beginning.

(3) Since the digital recording is performed, a special video image in a special reproducing mode such as noiseless slow motion, noiseless stop motion, or the like according to the conventional digital technique, which can be realized by only the video tape recorder hitherto can be also provided.

(4) Since the recording medium is small, a compact memory of a large capacity can be realized.

In the embodiment described above, it is intended to simultaneously record and reproduce image data of up to six channels and the buffer memory 130 is constructed so that the image data of each channel can be recorded for up to one hour. However, by reducing the number of channels, the recording time per channel can be further increased. For example, in case of using only one channel, all of the probes can be allocated to one channel, so that by dropping the recording rate into ⅙ (actually, a stage scanning frequency is reduced into ⅙), the image data can be recorded for up to six hours.

In the embodiment, an LB ultrathin film having an area of (16 mm×14.4 mm) is used as a recording medium 12. Therefore, even when the memory capacity is increased several times, a problem such that the volume that is occupied by the recording medium extremely increases in a conventional magnetic tape or magnetooptic disk never occurs.

Since the invention has been constructed as mentioned above, there are the following effects.

For example, buffer memory means can be constructed as a memory to which the principle of the scanning tunneling microscope was applied. The buffer memory means which can simultaneously execute the writing operation and the reading operation can be constructed. Therefore, it is possible to provide a digital television receiver having buffer memory means having a recording capacity and a data transfer speed which are enough to execute signal processes of a time base longer than the conventional one.

What is claimed is:

1. A television receiver comprising:

receiving means for receiving a broadcasting signal;

producing means for producing an image signal and a voice signal from the broadcasting signal received;

a plurality of memory means for storing said image signal and said voice signal, each of said memory means including (i) a plurality of probes, (ii) a recording medium arranged so as to face said plurality of probes, and (iii) recording and reproducing means for recording said image signal and said voice signal on said recording medium by use of said plurality of probes and for reproducing said recorded image signal and said voice signal by use of said plurality of probes;

means for controlling said plurality of memory means such that when said image signal and said voice signal are being recorded by at least one of said memory means, the recorded image signal and voice signal are reproduced by at least one of the remaining memory means;

display means for converting the image signal outputted from said plurality of memory means into the video image; and speaker means for converting the voice signal outputted from said plurality of memory means into a voice sound.

2. A television receiver according to claim 1, wherein each said memory means further includes voltage applying means for applying a voltage between each of said plurality of probes and said recording medium, wherein each said memory means allows said voltage applying means to apply the voltage between each of said plurality of probes and said recording medium on the basis of said image signal and said voice signal.

3. A television receiver according to claim 1, wherein said image signal and said voice signal are digital signals.

* * * * *

UNITED STATES PATENT AND TRADEMARK OFFICE
CERTIFICATE OF CORRECTION

PATENT NO. : 5,510,858
DATED : April 23, 1996
INVENTOR(S) : SHIDO, ET AL.

It is certified that error appears in the above-indentified patent and that said Letters Patent is hereby corrected as shown below:

On the title page, in the drawing :

"CONVERTOR" (blocks 152 and 145) should read --CONVERTER--.

On the title page, in the drawing :
SHEET 1 OF 8

"CONVERTOR" (blocks 152 and 145) should read --CONVERTER--.

Column 4

Line 9, "unit" should read --Unit--.

UNITED STATES PATENT AND TRADEMARK OFFICE
CERTIFICATE OF CORRECTION

PATENT NO. : 5,510,858
DATED : April 23, 1996
INVENTOR(S) : SHIDO, ET AL.

It is certified that error appears in the above-indentified patent and that said Letters Patent is hereby corrected as shown below:

<u>Column 5</u>

```
    Line 4, "unit" should read --Unit--;
    Line 21, "signal processing unit" should read
--Signal Processing Unit--; and
    Line 37, "signal processing unit" should read
--Signal Processing Unit--.
```

Signed and Sealed this

Twenty-ninth Day of October 1996

Attest:

BRUCE LEHMAN

*Attesting Officer*  *Commissioner of Patents and Trademarks*